Oct. 17, 1950      C. E. COLLING      2,526,199
TWO-PIECE RODENT-TRAP OF SPRINGY SHEET MATERIAL
Filed Jan. 24, 1947      2 Sheets-Sheet 1
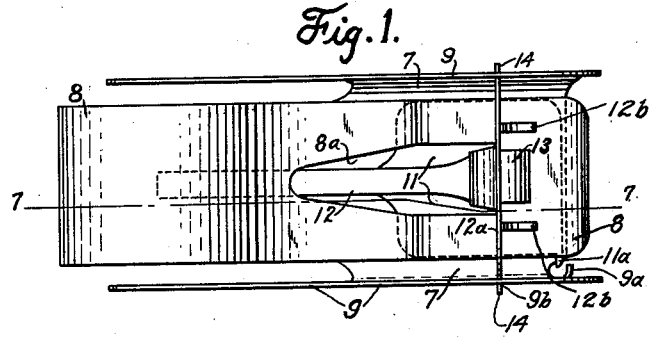
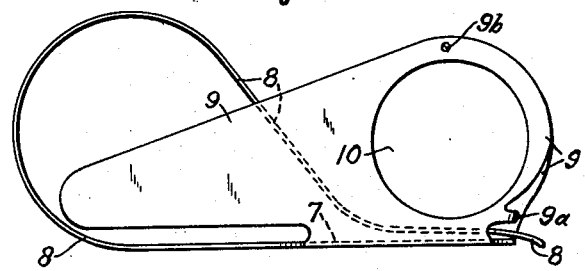
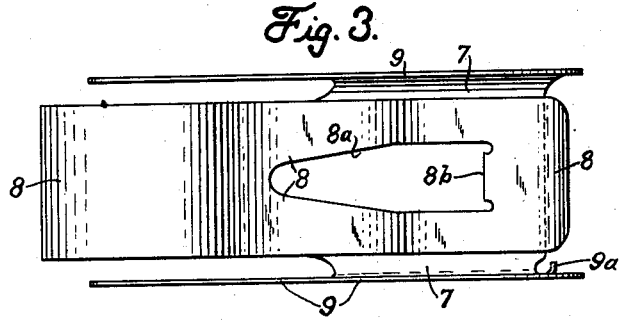
Inventor,
C. E. COLLING.
Attorney.

Oct. 17, 1950          C. E. COLLING          2,526,199
TWO-PIECE RODENT-TRAP OF SPRINGY SHEET MATERIAL
Filed Jan. 24, 1947          2 Sheets—Sheet 2
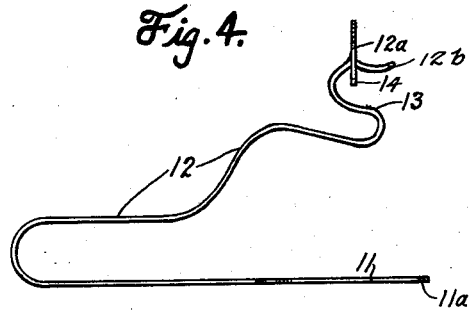
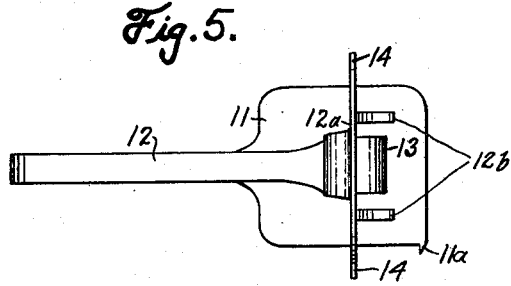
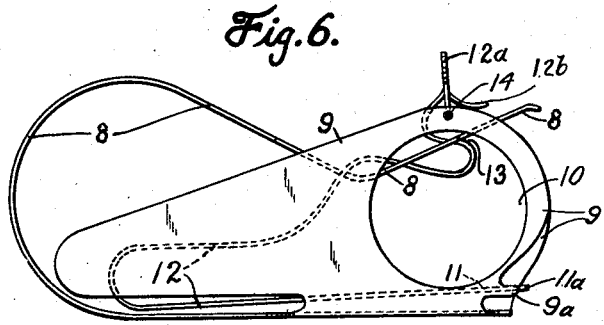
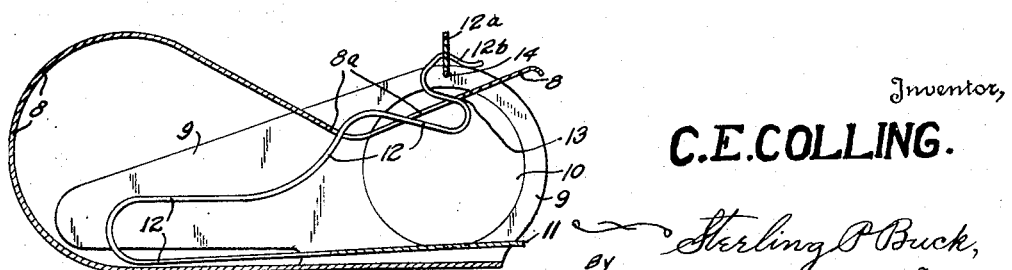
Inventor,
C. E. COLLING.
Sterling P Buck,
By          Attorney.

Patented Oct. 17, 1950

2,526,199

UNITED STATES PATENT OFFICE 2,526,199

TWO-PIECE RODENT TRAP OF SPRINGY SHEET MATERIAL

Charles E. Colling, San Diego, Calif.

Application January 24, 1947, Serial No. 724,092

2 Claims. (Cl. 43—82)

This invention relates to animal traps, and especially to a two-piece rodent-trap of springy sheet material. The main object of this invention is to provide a low-cost trap that does not depend on bait but which takes advantage of the habits of rodents, namely, travelling in their respective, usual paths along the bases of walls and into and out of holes in the wall-bases.

Another object is to provide such mutual cooperation between the two primarily separate parts that they retain one another in cooperative relation independently of any extrinsic securing means.

Other objects and important features are pointed out or implied in the following details of description, in connection with the accompanying drawings in which:

Fig. 1 is a top-plan view of the complete combination or rodent-trap having its parts in the thrown or unset position or relation.

Fig. 2 is a side elevation of the major unit of the trap.

Fig. 3 is a top-plan view of said major unit.

Fig. 4 is a side elevation of the minor unit of the trap.

Fig. 5 is a top-plan view of the minor unit of the trap.

Fig. 6 is a side elevation of the complete trap having its parts set or adjusted in the proper relation to receive and entrap a rodent or other animal which attempts to pass therethrough and which imposes its weight upon the pedal of the trap.

Fig. 7 is a longitudinal vertical sectional view along the line 7—7 of Fig. 1.

Referring to these drawings in detail, in which, similar reference numerals refer to similar parts throughout the several views, the invention is described in detail as follows:

In broad terms, the invention comprises the combination of two primarily separate stiff-bendable sheet-metal portions shown separately in Figs. 2 and 4, and co-operatively united by their inherent securing means at 9b—14 (Figs. 1 and 6) in a proper relation to provide means operable by an animal so as to clamp said animal.

More specifically, the invention consists of a major unit, as in Figs. 2 and 3, and a minor unit, as in Figs. 4 and 5; each of these units being separately and primarily formed of blanks of stiff-bendable sheet-material, the major unit comprising a floor 7, a springy slotted clamp-jaw 8 which is united with said floor and is properly curved to extend upward and downward and over and above said floor and to exert a spring-pressure towards said floor, the major unit also comprising walls 9 united with and extending upward from opposite edges of said floor and having animal-receiving openings 10 therethrough; said minor unit comprising a broad pedal-portion 11 normally between said openings 10 and above said floor 7, and a narrow springy portion 12 that extends upward and downward through the clamp-jaw's slot 8a (see figures 1 and 6) and has a catch 13 for trap-setting engagement with the lower edge of a catch-engaging element 8b of said clamp-jaw 8, pivotal means 14 being provided above said catch 13 to movably secure the latter in an elevated position over said pedal-portion 11, said pedal-portion 11 being operable by weight of an animal thereon for causing said catch 13 to release said clamp-jaw 8 so the latter can strike and clamp said animal on said pedal-portion 11.

One of the walls has an inwardly extending stud 9a thereon, said pedal-portion 11 has thereon a laterally extending detent 11a that is engageable with said stud 9a and is releasable from the stud to permit the spring-pressure of the clamp-jaw to force said catch 13 out of engagement with said clamp-jaw 8.

The walls 9 are formed with pivot-bearings 9b in which the pivots 14 are seated, and these pivots are formed integrally with a bridge-bar 12a that is an integral part of the minor unit, as are the elements 11, 12, 12b and 13. The finger-pieces 12b are for tilting the elements 11 and 12 on the pivots 14 so as to effect latching engagement at 13 and to raise the detent 11a to engage with the stud 9a. This minor unit also includes the detent 11a that is normally engaged with the stud 9a of one of the walls 9, and while the clamp-jaw is held up by engagement of its catch 13, with the element 8b of the clamp-jaw 8, namely, a marginal element of the slot 8a. Pressure of the clamp-jaw 8 is resisted by the minor element until the detent 11a is moved from the position shown in Fig. 6, out of contact with the stud 9a, as by weight of an animal on the pedal 11, whereupon, the pedal is forced both downward and leftward to the position shown in Fig. 1, this resulting in a sufficient movement of the catch 13 to release the clamp-jaw 8 and permit the latter to be snapped down by its own spring action, thereby to grip or clamp any animal that attempts to pass through the openings 10 and thus imposes its weight on the pedal 11.

In assembling the major and minor units, the clamp-jaw is held up to its position in Fig. 6 by any appropriate means, while the elements 12a and 14 are turned in proper position under the slot 8a, then passed up therethrough, then turned with the pivots 14 adjacent to the bearings 9b, and the tops of the springy walls are then sprung apart while the pivots 14 are placed in the respective bearings 9b and while the clamp-jaw 8 is seated between the walls 9 and over the pedal 11, as in Fig. 1.

I have no intention to limit my patent protection to the foregoing precise details of construction and arrangement shown and described, for the invention is susceptible of numerous changes within the scope of the inventive ideas, as implied and claimed.

What I claim as my invention is:

1. An animal trap that consists of a major unit and a minor unit separately formed of blanks of stiff-bendable sheet material, the major unit comprising a floor, a springy slotted clamp-jaw that includes a catch-engaging element and is united with said floor and is properly curved to extend upward and downward and above and across said floor and to exert a spring-pressure towards said floor, the major unit also comprising walls united with and extending upward from opposite edges of said floor and having animal-receiving openings therethrough; and said minor unit comprising a broad pedal-portion normally between said openings and above said floor, a narrow springy portion that extends through the clamp-jaw's slot and has a catch for trap-setting engagement with said catch-engaging element of said clamp-jaw, and pivotal means above said catch to movably secure the latter in an elevated position over said pedal-portion, said pedal-portion being operable by weight of an animal thereon for causing said catch to release said clamp-jaw so the latter can strike and clamp said animal when on said pedal-portion.

2. In the animal trap defined by claim 1, one of said walls having at its lower portion an inwardly extending stud thereon, said pedal-portion having thereon a detent that projects toward said one of the walls and is engageable with said stud and is releaseable from the stud to permit the spring-pressure of said clamp-jaw to force said catch out of engagement with said clamp-jaw.

CHARLES E. COLLING.

REFERENCES CITED

The following references are of record in the file of this patent:

UNITED STATES PATENTS

| Number | Name | Date |
| --- | --- | --- |
| 914,912 | Atkins | Mar. 9, 1909 |
| 1,072,375 | Adams | Sept. 2, 1913 |
| 1,290,697 | Banash | Jan. 13, 1919 |
| 1,580,583 | Catlin | Apr. 13, 1926 |
| 1,826,799 | Lehuta | Oct. 13, 1931 |
| 2,420,371 | Hampton | May 13, 1947 |